W. H. Bryant,
Drawing Tires from Driving Wheels,
Nº 70,796.
Patented Nov. 12, 1867.

Witnesses
E. S. Sherman
E. Attest

Inventor
Wm. H. Bryant

United States Patent Office.

WILLIAM H. BRYANT, OF CHICAGO, ILLINOIS.

Letters Patent No. 70,796, dated November 12, 1867.

---

IMPROVED APPARATUS FOR DRAWING TIRES FROM ENGINE DRIVING-WHEELS.

---

The Schedule referred to in these Letters Patent and making part of the same.

---

TO ALL WHOM IT MAY CONCERN:

Be it known that I, WILLIAM H. BRYANT, of Chicago, have invented a new and useful Apparatus for Removing Tire from Wheels; and I do declare that the following is a full, clear, and exact description of the construction and operation of the same, reference being had to the accompanying drawings, making part of this specification, in which—

Figure 1:
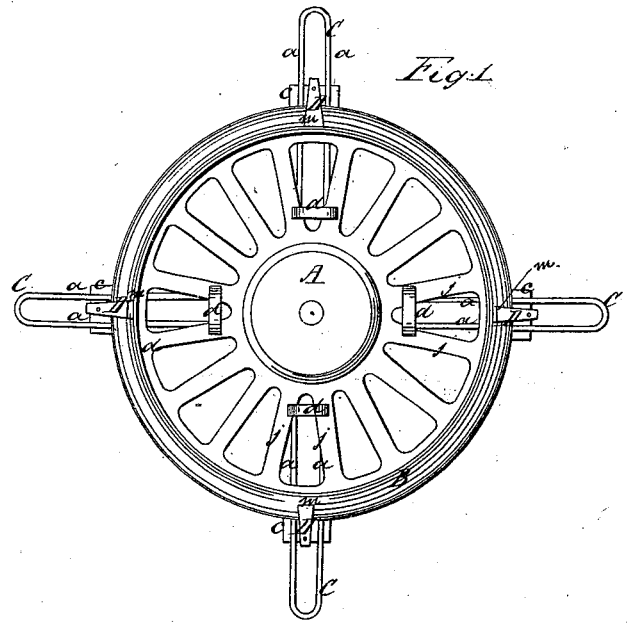

Figure 1 is an inside view of a driving-wheel with the apparatus attached for use.

Figure 2:
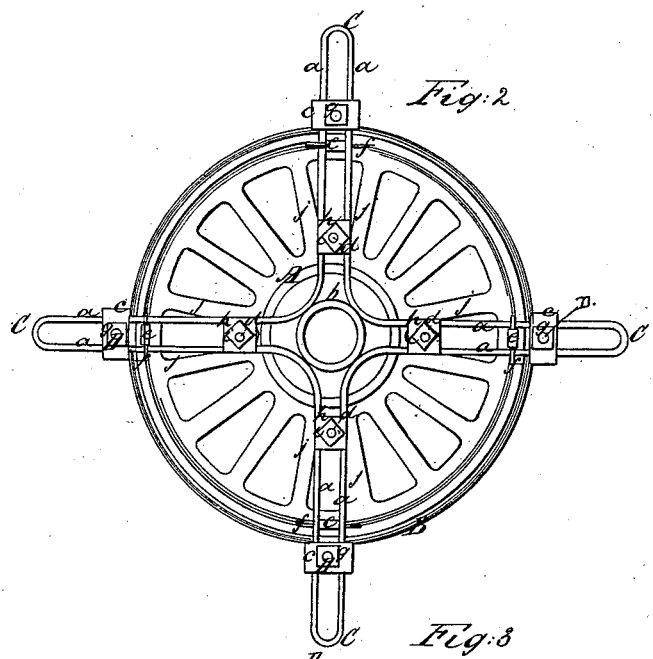

Figure 2, a reversed view of the same.

Figure 3:
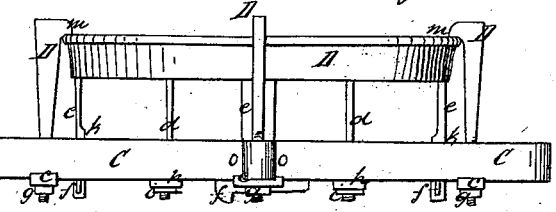

Figure 3, a side view of the apparatus attached to a wheel, ready to use.

Like letters refer to like parts in all the figures.

To enable others skilled in the art to make and use my invention, I proceed to describe its construction and operation.

My device is designed to be used chiefly for drawing tire from the driving-wheels of railroad engines.

A represents the driving-wheel of an engine; B the tire upon such wheel. I make a frame somewhat larger than an ordinary driving-wheel, of the form shown in the drawings, having a suitable number of arms C C properly secured at the centre. As shown in the drawings, these arms and the whole frame are made of wrought iron, about four and a half inches wide, and one inch thick. The arms are not solid, but each arm has two parts, $a$ $a$, with a space about two inches wide between them, so that the apparatus can be adjusted to wheels of various sizes. These arms, which are the chief part of the frame, may be made of a continuous bar of iron, and may be secured and strengthened by riveting the same to a metal hoop or ring, $b$. I find that four arms are sufficient in ordinary cases, though I do not confine myself to that number. The supports $e$, at one end, are four inches wide, seven inches long, and three-fourths of an inch thick. One end is designed to rest on the wheel A; the other end is narrower, so as to pass through between the two parts $a$ $a$ of the arms C. At $k$ is a shoulder, on which the arm C rests. A pin, $f$, passing through the support $e$, holds it in place. The broad portion of the supports may be about seven inches long. The draw-bolts D are one and three-fourths inch bolts in size, provided with a screw-thread at one end, and with a projection or hook, $m$, at the other end. With the draw-bolts D, I use a washer, $c$, cut away or recessed on one side, so as to fit over the two parts $a$ $a$ of the arms C, and serving the purpose of preventing the draw-bolts from slipping. The supporting-bolts $d$ are inch bolts in size, provided with a screw-thread at one end, and with a head on the other end, on two sides of the same, as shown in fig. 1. With these bolts I use an ordinary washer, $h$. These supporting-bolts $d$ are not an indispensable part of the apparatus; it can be used without them; but they are useful to steady the apparatus while in use, and to prevent the same from tumbling down when the tire is drawn. In use, the supports $e$ are placed, one between the two parts of the several arms, and fastened in place by the pins $f$, at such distances from the centre that when placed on the wheel the supports will rest on the wheel just inside of the tire. When thus placed the frame is fastened in position by means of the supporting-bolts $d$, the heads of which catch against the arms $j$ of the wheel. They are secured by means of the nuts $i$. The draw-bolts D are so placed that the projection or hook $m$ catches the tire, when, by turning the nuts $g$, the tire can be readily drawn off. By reversing the position of my apparatus, and placing it on the opposite side of the wheel, the tire can be drawn on to the wheel.

Having thus fully described my invention, what I claim as new, and desire to secure by Letters Patent, is—

The apparatus for drawing tire from wheels, herein described, constructed and operating substantially as herein set forth.

WM. H. BRYANT.

Witnesses:
E. B. SHERMAN,
E. A. WEST.